(12) United States Patent
LoPinto

(10) Patent No.: US 7,215,711 B1
(45) Date of Patent: May 8, 2007

(54) BROADCASTING COMPUTER FILES USING TELEVISION

(76) Inventor: Frank John LoPinto, 11529 Scottsbury Ter., Germantown, MD (US) 20876

( * ) Notice: Subject to any disclaimer, the term of this patent is extended or adjusted under 35 U.S.C. 154(b) by 836 days.

(21) Appl. No.: 10/617,939

(22) Filed: Jul. 11, 2003

Related U.S. Application Data

(60) Provisional application No. 60/397,733, filed on Jul. 22, 2002.

(51) Int. Cl.
*H04N 7/12* (2006.01)
(52) U.S. Cl. ................................. 375/240.26
(58) Field of Classification Search ........... 375/240.01, 375/240.26; *H04N 7/12*
See application file for complete search history.

(56) References Cited

U.S. PATENT DOCUMENTS 6,008,857 A * 12/1999 Keery et al. ........... 375/240.01

* cited by examiner

*Primary Examiner*—Young Lee

(57) ABSTRACT

A computer file stored on a sender's disk (102) is converted into a data packet (112) or a sequence of packets. Packets are converted into images that are written to a videocassette (118) or a removable storage device (105). The images are used to create a television program. A television station broadcasts the program, which is received by a receiver's computer system (201). A video capture card (204) converts the program into a sequence of digital images. The images are converted into a sequence of data packets (212) and the data packets are converted to a file stored on the receiver's disk (202).

16 Claims, 16 Drawing Sheets

| Image Area | Ordered Set of Memory Address Offsets |
|---|---|
| 0 | { Set 0} |
| 1 | { Set 1} |
| 2 | { Set 2} |
| Amax | { Set Amax} |

| Row | Red | Green | Blue | Color Value |
|---|---|---|---|---|
| 0 | r0 | g0 | b0 | c0 |
| 1 | r1 | g1 | b1 | c1 |
| 2 | r2 | g2 | b2 | c2 |
| .. | | | | |
| .. | | | | |
| .. | | | | |
| $2^N - 1$ | | | | |

BROADCASTING COMPUTER FILES USING TELEVISION

CROSS-REFERENCE TO RELATED APPLICATION

This application claims the benefit of Provisional Patent Application Ser. No. 60/397,733 filed 2002 Jul. 22.

FEDERALLY SPONSORED RESEARCH

Not Applicable

SEQUENCE LISTING OR PROGRAM

Not Applicable

BACKGROUND

1. Field of Invention

This invention relates to broadcasting computer files, specifically to broadcasting computer files using television.

2. Description of Prior Art

Transferring computer files has become a common part of modern life. Knowingly or unknowingly, people rely on computer file transfers whenever they send e-mail, receive e-mail, or use the World Wide Web.

File transfer is an integral part of the computer industry. Commercial software is delivered by transferring files from manufacturers to consumers using the Internet for electronic file transfers or magnetic or optical disks for physical file transfers. Encyclopedias are published as a set of files that are written onto an optical disk and delivered to consumers.

File transfer and, more specifically, file publishing is the most common use of the Internet and the Web. In fact, the Web was invented as a means to publish information needed by high energy physicists. Web sites are published by a wide variety of sources ranging from individuals (i.e., personal Web pages) to major news organizations. In reality, what is published are computer files that are placed on file servers connected to the Internet.

Although there are millions of Web sites they are not accessed equally as often. A small percentage of Web sites accounts for a large percentage of file access requests. For example the Web site of a major news organization, corporation, or government agency is "visited" much more often than an obscure personal Web page.

Although the Web is a two-way communications system there is a significant amount of activity that could be better served by a one-way system. For example, when a user "browses" the Web site of a news organization most of the data communications between his browser software and the site consists of file transfers or "downloads". The communications pattern is "asymmetric" meaning that there is more traffic in one direction than in the other.

There are examples of asymmetric communications patterns on the Internet where the data communication is almost entirely in one direction. People who use e-mail to get "news alerts" or who subscribe to mailing lists are effectively requesting one-way communications from the Web site or list publisher. Streaming media and webcasting are other good examples. Applications like these could be provided by a true one-way communications system.

Television is a one-way communications system and several inventors have proposed ways to use television to broadcast data. Some proposals, including U.S. Pat. No. 6,268,889 to Kouri (2001) and U.S. Pat. No. 6,219,537 to James, et al. (2001) have disclosed methods of using the vertical blanking interval in an analog television signal to encode and transmit data. U.S. Pat. No. 6,556,247 to Ranta, et al. (2003) discloses a method of decoding data that is written into the horizontal overscan portion of the television image. All of these methods avoid modifying the television images that are visible to human viewers. As a result, these methods can support only low data transmission rates since they have a limited amount of bandwidth available for data transmission.

All of the proposals mentioned above require analog television transmission. Other proposals requiring analog television transmission are disclosed in U.S. Pat. No. 6,535,253 to Barton et al. (2003) and U.S. Pat. No. 5,737,026 to Lu, et al. (1998). A proposal disclosed in U.S. Pat. No. 6,549,241 to Hiori (2003) is one of many that require digital television transmission. All proposals that require a specific television transmission method suffer because of the Federal Communications Commission requirement for all broadcasters to switch from analog to digital television transmission by 2006. The methods requiring analog transmission will not be applicable after the transition. The usefulness of the methods requiring digital transmission will depend on consumer purchases of new equipment and new services offered by digital broadcasters.

A proposal disclosed in U.S. Pat. No. 5,790,937 to Gutle (1998) uses the bandwidth of a television channel to broadcast data. A proposal disclosed in U.S. Pat. No. 6,122,010 to Emelko (2000) uses a television signal to encode data. Both of these require special hardware to manipulate electrical signals and further suffer because they cannot transmit data and images at the same time.

Inventors have proposed methods of broadcasting data that manipulate television images rather than television signals. U.S. Pat. No. 6,078,360 to Doornhein et al. (2000), U.S. Pat. No. 3,984,624 to Waggener (1976), U.S. Pat. No. 6,512,835 to Nuamo et al. (2003) and U.S. Pat. No. 6,339,449 to Ikeda et al. (2002) disclose methods whereby data is encoded in the visible part of a television image by slightly modifying the image in a manner that is imperceptible to a human viewer. Disadvantages of these proposals are that they are complex and the data transmission rates are limited so that the image modifications are imperceptible.

Other methods have been proposed that manipulate television images in a manner that is perceptible to human viewers. U.S. Pat. No. 5,262,860 to Fitzpatrick, et al. (1993) discloses a method of displaying bar codes and characters that can be recognized by optical character readers and bar code readers. It suffers because the data transmission rate is limited due to the restricted data formats.

A proposal disclosed in U.S. Pat. No. 6,008,857 to Keery, et al. (1999) uses colors assigned to specific locations to represent data in a video frame. A disadvantage of this proposal is that it provides no means to reproduce a file having a specific name and a specific length. A second disadvantage is that the method proposed to assign colors limits the color combinations that can be used in an image.

OBJECTS AND ADVANTAGES

Accordingly several objects and advantages of the present invention are:

(a) to provide a simple method of broadcasting data that does not depend on a specific digital or analog television format;

(b) to provide a method of broadcasting data that can operate at high data transmission rates;

(c) to provide a method of broadcasting data that can be used with the existing analog format and with the digital transmission format mandated after 2006;

(d) to provide a method of broadcasting data that does not require special electronic signal processing equipment;

(e) to provide a method of broadcasting data that can simultaneously transmit images and binary information;

(f) to provide a method of broadcasting data that can use the greatest number of color combinations so that the images seen by a television viewer are aesthetically pleasing;

(g) to provide a method of broadcasting computer files that are decoded as computer files having the exact name, length, and contents as the originals.

Further objects and advantages will become apparent from a consideration of the ensuing description and drawings.

SUMMARY

The present invention uses television to transmit a computer file by converting the file into a sequence of data packets, converting the packets into a sequence of video frames, incorporating the frames into a television program, delivering the program to a television station, and causing the television station to broadcast the program. Receivers within the reception area of the station convert the television program into a sequence of video frames, convert the video frames into a sequence of data packets, and convert the packets into computer a computer file having the same name and contents as the one transmitted.

DRAWINGS

Drawing Figures

FIG. 1 A diagram of the Sender's Equipment.

FIG. 1*a* Alternate embodiment of Sender's Equipment.

FIG. 2 A description of a pixel coordinate system.

FIG. 3 Memory Layout of a Video RAM.

FIG. 4 Image Definition Table.

FIG. 5 Color Code Table.

FIG. 6 Data Packet.

FIG. 7 Flowchart of the Sender's Program.

FIG. 8 Flowchart of the Painter—a component of Sender's Program.

FIG. 8*a* Flowchart for first alternate embodiment of Painter.

FIG. 8*b* Flowchart for second alternate embodiment of Painter.

FIG. 9 A diagram of the Receiver's Equipment.

FIG. 10 Flowchart of the Receiver's Program.

FIG. 11 Flowchart of the Image Decoder—a component of Receiver's Program.

FIG. 11*a* Flowchart of alternate embodiment of Image Decoder.

FIG. 11*b* Flowchart of a second alternate embodiment of Image Decoder.

FIG. 12 Flowchart of the Color Index Identifier—a component of Receiver's Program.

FIG. 13 Flowchart of the File Creator—a component of Receiver's Program.

FIG. 13*a* Flowchart of alternate embodiment of File Creator.

Reference Numerals in Drawings

| | | | |
|---|---|---|---|
| 100 | Sender's Program | 101 | Sender's Computer System |
| 102 | Sender's Disk | 104 | Computer Graphics Card |
| 105 | Removable Storage Device | 106 | Video RAM |
| 108 | Sender's Image Definition Table | 110 | Sender's Color Code Table |
| 112 | Data Packet | 114 | Cable |
| 116 | From Antenna Connector | 117 | Video Cassette Recorder System |
| 118 | Video Cassette | 200 | Receiver's Program |
| 201 | Receiver's Computer System | 202 | Receiver's Disk |
| 204 | Video Capture Card | 206 | Off screen Buffer |
| 208 | Receiver's Image Definition Table | 210 | Receiver's Color Code Table |
| 212 | Receiver's Data Packet | 213 | From Antenna Connector |
| 214 | Receiver's Cable | 216 | To TV Connector |
| 217 | Receiver's Equipment | | |

DETAILED DESCRIPTION

Sender's Equipment

FIG. 1 shows a Sender's Computer System (101) and a Video Cassette Recorder System (117). The Sender's Computer System comprises a Sender's Program (100), a Sender's Disk (102), a Computer Graphics Card (104) comprising a To TV Connector (113), a Video RAM (106), a Sender's Image Definition Table (108), a Sender's Color Code Table (110), and a Sender's Data Packet (112). The Video Cassette Recorder System comprises a From Antenna Connector (116) and a Video Tape (118). A cable (114) joins connector 113 and connector 116.

FIG. 1*a* shows an alternate embodiment of the Sender's Computer System. The graphics card (104) and video cassette recorder (117) are replaced by a Removable Storage Device (105). By way of example, the storage device is a CD-RW optical disk.

FIG. 2 shows a Pixel Coordinate System used by the graphics card (104). Images are displayed by selecting the color of each pixel. A pixel is identified by specifying its row number and its column number. The graphics card is programmed by setting a value called graphics mode. The graphics mode determines the numbers Cmax and Rmax. It also determines a number B which is equal to the number of bytes required to specify the color of a pixel.

The Video RAM (106) is a read-and-write memory used to describe the colors of each of the pixels. FIG. 3 shows the memory layout of the RAM. Each rectangle represents a byte, or eight bits, of data. Memory locations are related to pixel coordinates r and c by the following formula:

Memory Address Offset=$B*(r*(Cmax+1)+c)$

Memory Address Offset is measured in bytes relative to the start of the Video RAM. The numbers r and c are the pixel's row and column numbers, respectively.

FIG. 4 describes an Image Definition Table. Each row describes an area. The first column in a row gives the Area Number of the area. The second column lists the row and column pairs for each pixel in the area. There are Amax+1 rows in the Image Definition Table.

The Sender's Image Definition Table (108) is an Image Definition Table used by the Sender's Program. It identifies non-overlapping areas within an image. An area is defined by the set of pixels that are needed to draw the area.

FIG. 5 describes a Color Code Table. Each row describes a color. The first column in a row contains the Index of the color. The next three columns contain the color's red, green, and blue components. The rightmost column contains a number that is written in the Video RAM to produce a pixel having the color described by the row. A number N is a positive integer. There are $2^N$ (two raised to the power N) rows in the table with N being a positive integer. The Sender's Color Code Table (110) is a Color Code Table used by the Sender's Program.

FIG. 6 shows a Data Packet. The packet contains a Sequence Number, a File ID, a Data Field, and a Checksum Field. Each field contains a fixed number of bits. The total length of the Data Packet is $N*(A_{max}+1)$. A Sender's Data Packet (112) is a Data Packet used by the Sender's Program.

Sender's Program

FIG. 7 is a software flowchart describing the Sender's Program (100). The program requires three inputs: a Filename, a File ID, and a Starting Sequence Number (SSN). The Filename is a string of characters that identify a file stored on the Disk (102). The File ID is a positive integer uniquely assigned to the Filename. In other words if a particular File ID number is assigned to one Filename, then it will not be assigned to different Filename. The number SSN is a positive integer.

The program opens the named file and then sets initial values for parameters S, filePos, and SN. The program then enters a processing loop. The processing loop consists of 11 processing steps. The first nine steps are indicated in FIG. 7. The tenth step consists of calling Painter, a software procedure. The eleventh step tests whether the end of the file has been reached.

Step 1 increments the Sequence Number, SN, by one. The first time through the loop SN will be equal to SSN.

Step 2 writes the Sequence Number into data packet.

Step 3 writes the File ID into the data packet.

Step 4 increments the filePos number by S. The first time through the loop S will be equal to zero.

Step 5 attempts to read S bits from the file starting at filePos bits from the beginning of the file.

Step 6 sets the number L equal to the number of bits that were read from the file during Step 5. Normally L will be equal to S. However if the number of bits in the file is less than filePos+S, then Step 5 will read fewer than S bits.

Step 7 writes the L bits that were read from the file into the data packet (112) starting at bit b.

Step 8 uses an algorithm that reads the Data Packet (112) and converts bits 0 through c−1 into a fixed-length number. This number is called the checksum. The length of the checksum equals d−c+1 where d and c are the bit position numbers shown in FIG. 6.

Step 9 writes the checksum into the Checksum Field of the Data Packet.

Sender's Program (100) executes a program called Painter. When Painter returns, the Sender's Program compares the numbers S and L. If they are the same then the program repeats Steps 1 through 9. Otherwise Sender's Program is complete and it returns to its caller passing the value of SN to its caller. In this manner the calling program can determine the Sequence Number contained in the last Data Packet created by the Sender's Program.

The Painter

FIG. 8 is a software flowchart describing the Painter. The Painter is a program that uses the Computer Graphics Card (104) to create images. The program (Painter) uses the Data Packet (112), the Color Code Table (110), and the Image Definition Table (108). It also uses an portion of read-and-write memory called the Off Screen Buffer. The buffer contains the same number of bytes as the Video RAM (106).

The Painter starts by setting the numbers A and P to zero. The program then executes a sequence of five steps.

Step 1 initializes the values stored in the Off Screen Buffer. Any initialization method can be used. For example the Painter could initialize the Off Screen Buffer by copying a frame from a video source into the Off Stream Buffer. As another example the Painter can skip the initialization step entirely.

Step 2 reads a number N bits from the Data Packet starting at bit P and writes them into a memory location C. Step 3 sets a number Index equal to the binary number stored in memory location C. Step 4 sets a number V equal to the to the color value appearing in row Index of the Color Code Table (110). Step 5 writes the number V into the Off Screen Buffer at every memory address offset contained in Set A of the Image Definition Table (108). Step 6 increments A by 1 and P by N.

If A does not exceed Amax+1 then the program repeats Step 1 through Step 6. The number Amax just referred to is the same as the number Amax in the Image Definition Table (108).

If A does exceed Amax+1 then all of the bits of the Data Packet are represented as the colors of areas defined in the Image Definition Table. The Painter creates a visual image when it copies the contents of the Off Screen Buffer into the Video RAM (106). One image contains one Data Packet.

The Painter creates visual images at a pre-determined rate of F frames per second. The program waits until 1/F seconds have passed since it had last copied the Off Screen Buffer into the Video RAM. Then it copies the current contents of the Off Screen Buffer into the Video RAM and returns to its caller.

The Painter—Alternate Embodiments

The Receiver's Equipment

Figure 9:
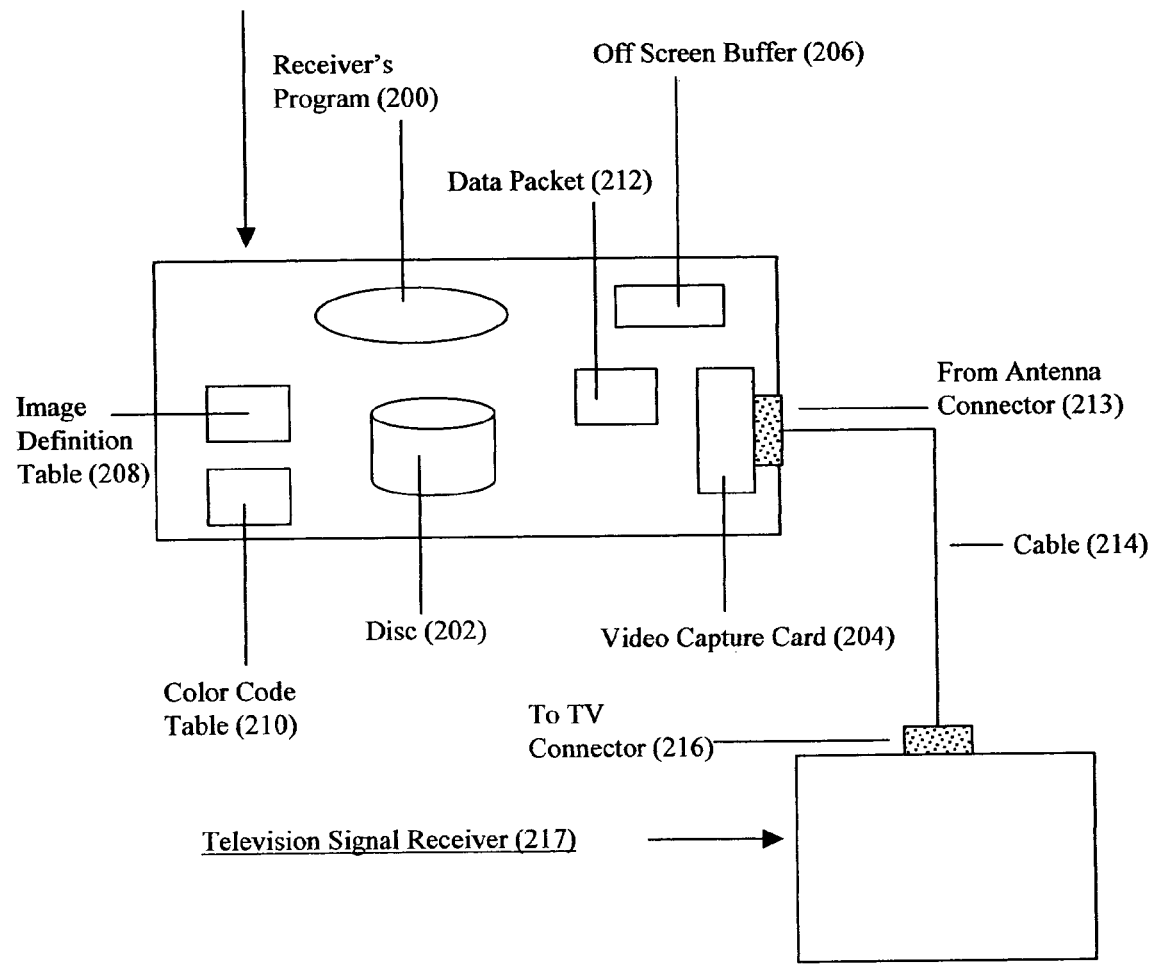

FIG. 9 shows a Receiver's Computer System (201) and a Television Signal Receiver (217). The Receiver's Computer System comprises a Receiver's Program (200), a Receiver's Disk (202), a Video Capture Card (204) comprising a From Antenna Connector (213), an Off Screen Buffer (206), a Receiver's Image Definition Table (208), a Receiver's Color Code Table (210), and a Receiver's Data Packet (212). The Television Signal Receiver comprises a To TV Connector (216). A cable (214) joins connector 213 and connector 216.

Figure 1:
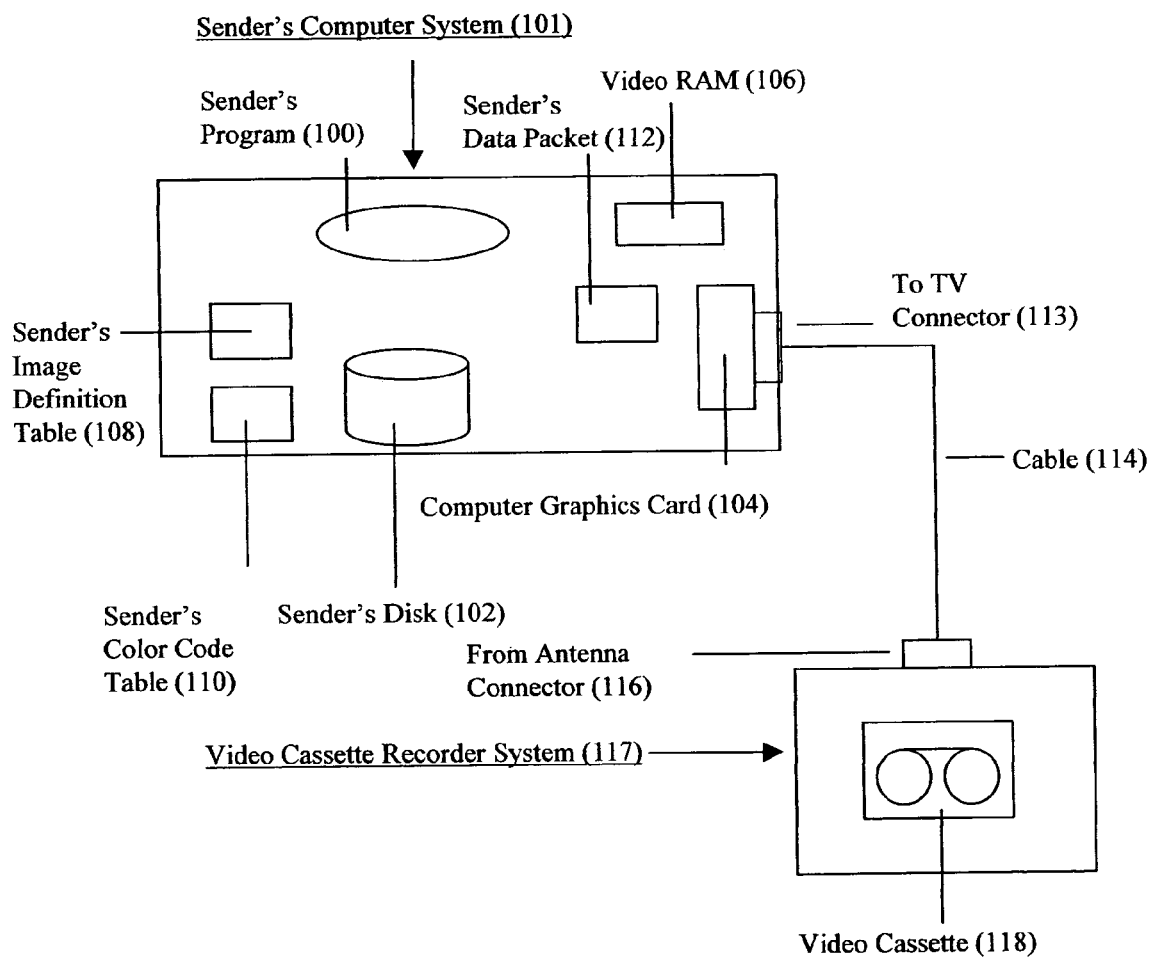
Figure 1A:
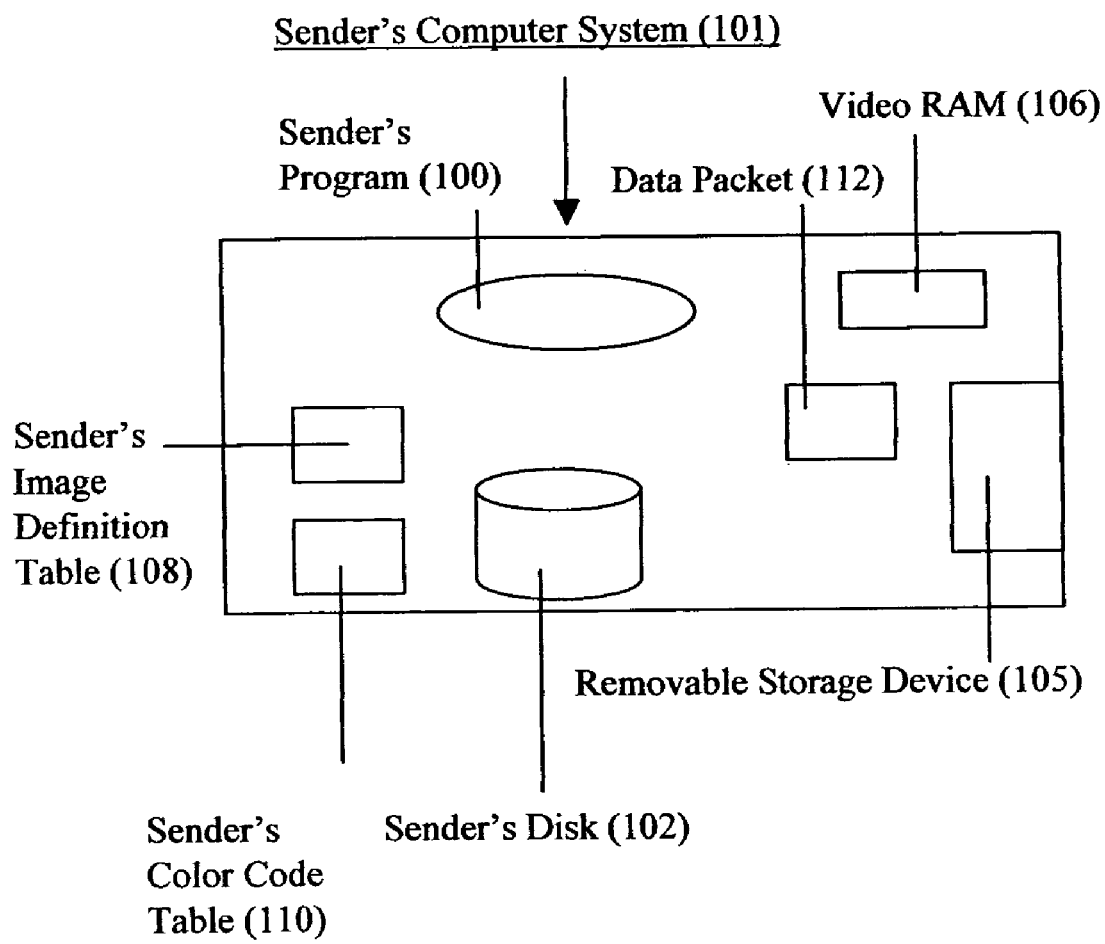
Figure 2:
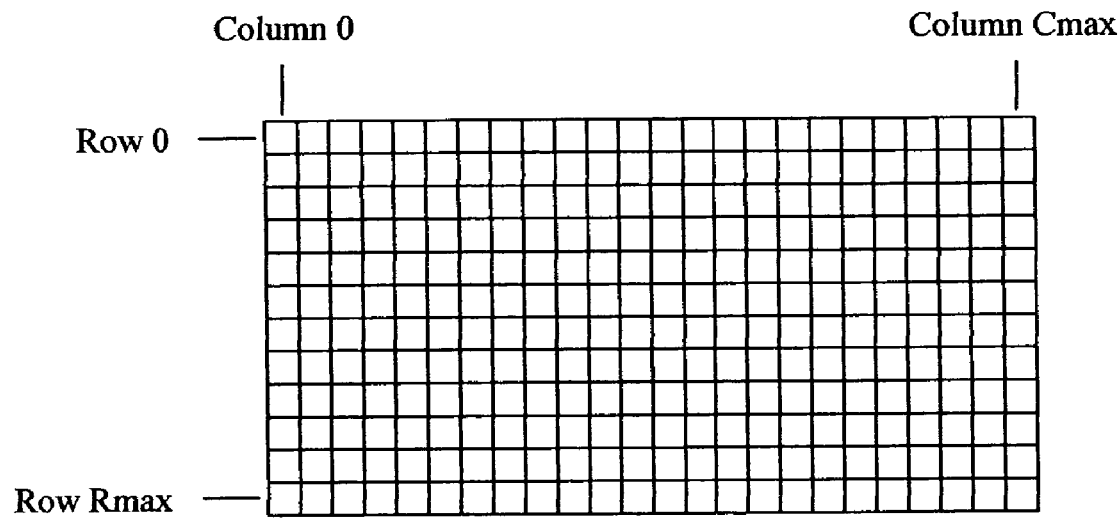

The Video Capture Card comprises a television tuner and a way to produce an array of pixels that represent a received television image. The Pixel Coordinate System shown in FIG. 2 is used to identify pixels. A pixel is identified by specifying its row number and its column number. The numbers Cmax, Rmax, and B are selectable. The number B is equal to the number of bytes required to represent the color of a pixel.

Figure 3:
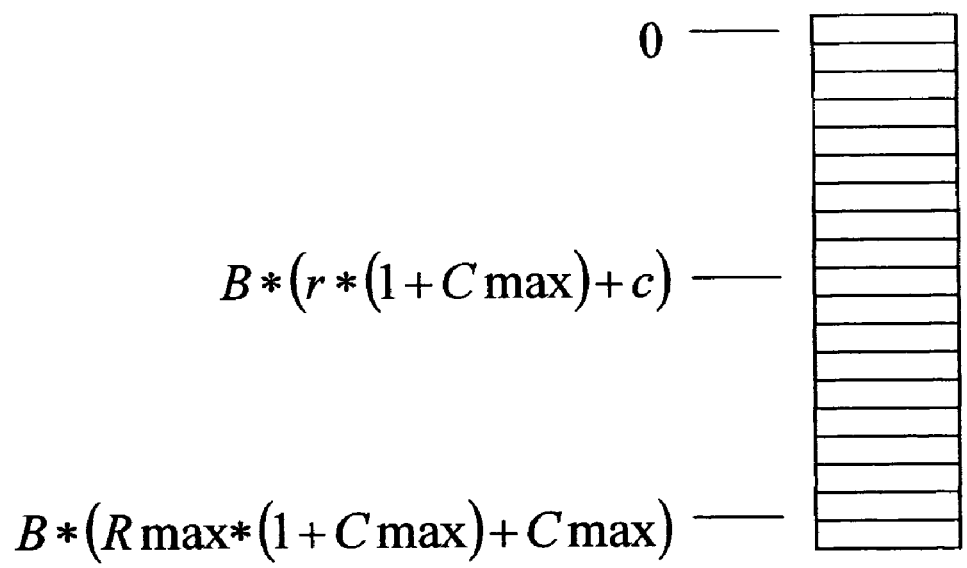

The Off Screen Buffer (206) is a read-and-write memory used by the Video Capture Card to store the colors of each of the pixels that represent a received television image. The memory layout of the Off Screen Buffer is shown in FIG. 3.

Figures 4, 5, 6:
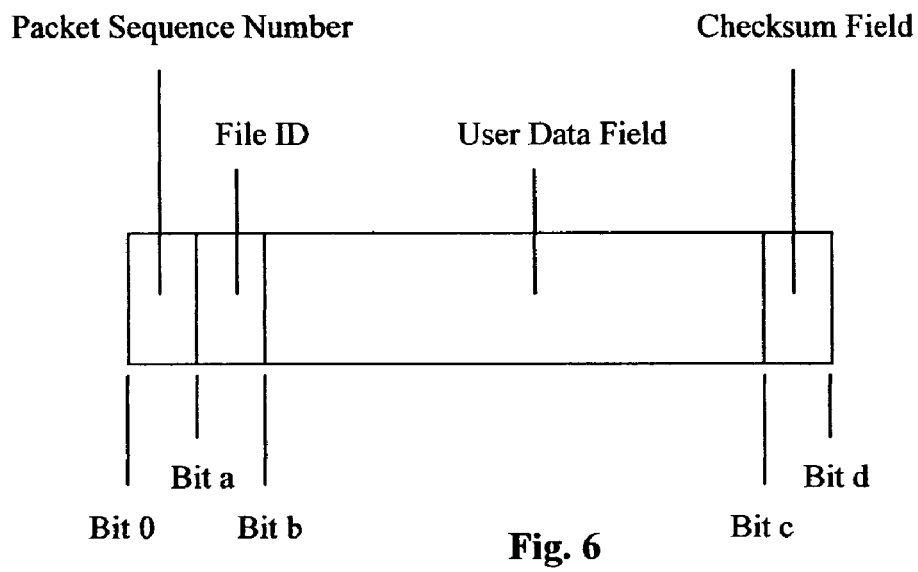
Figure 7:
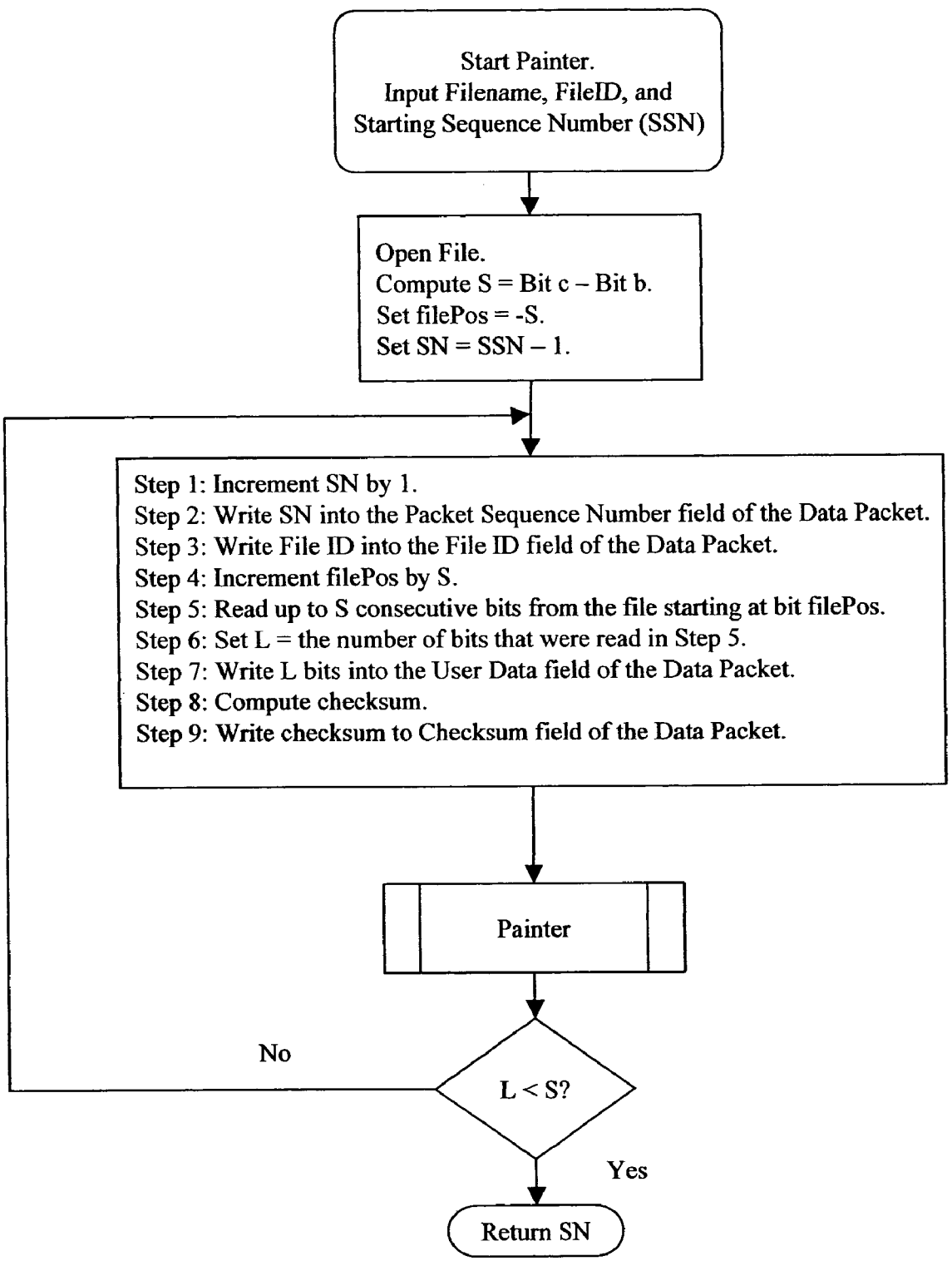
Figure 8:
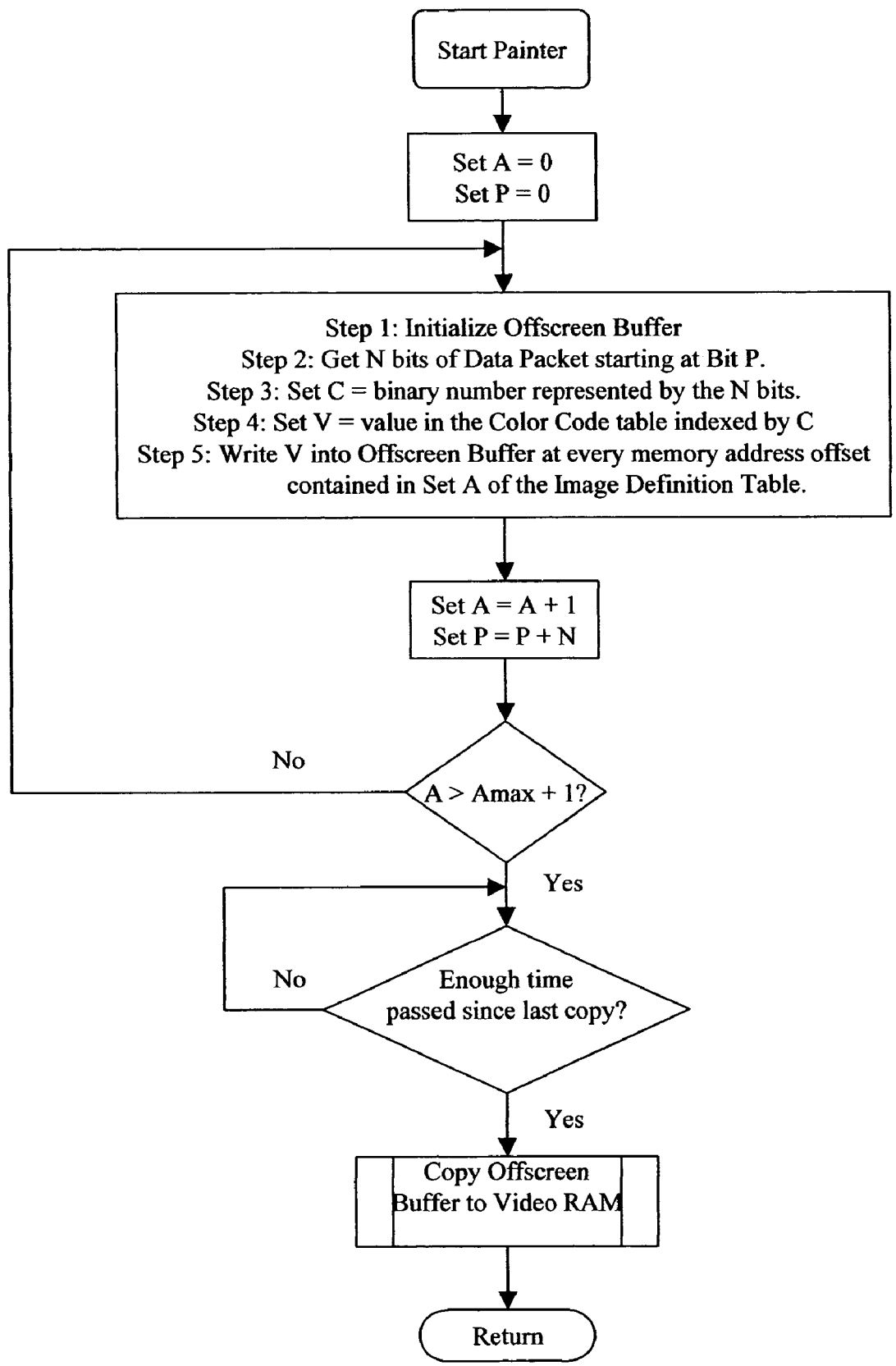
FIG. 8a shows an alternate embodiment of the Painter. Pre-Determined Marking is a specific, pre-determined pattern of pixel colors and locations.
FIG. 8b shows a second alternate embodiment of the Painter. Images created in the Off Screen Buffer are copied to a computer graphics file.
Figure 8A:
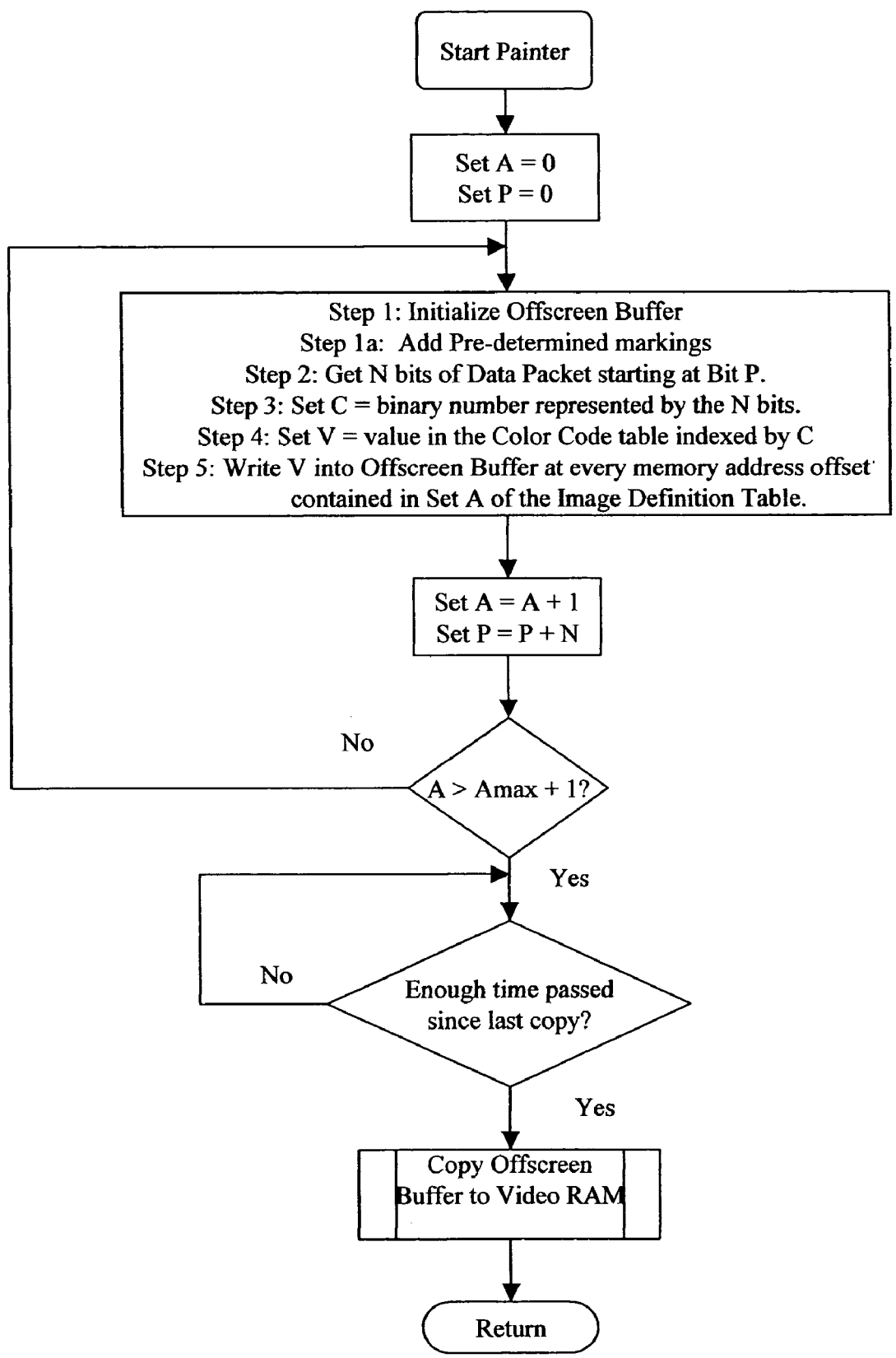
Figure 8B:
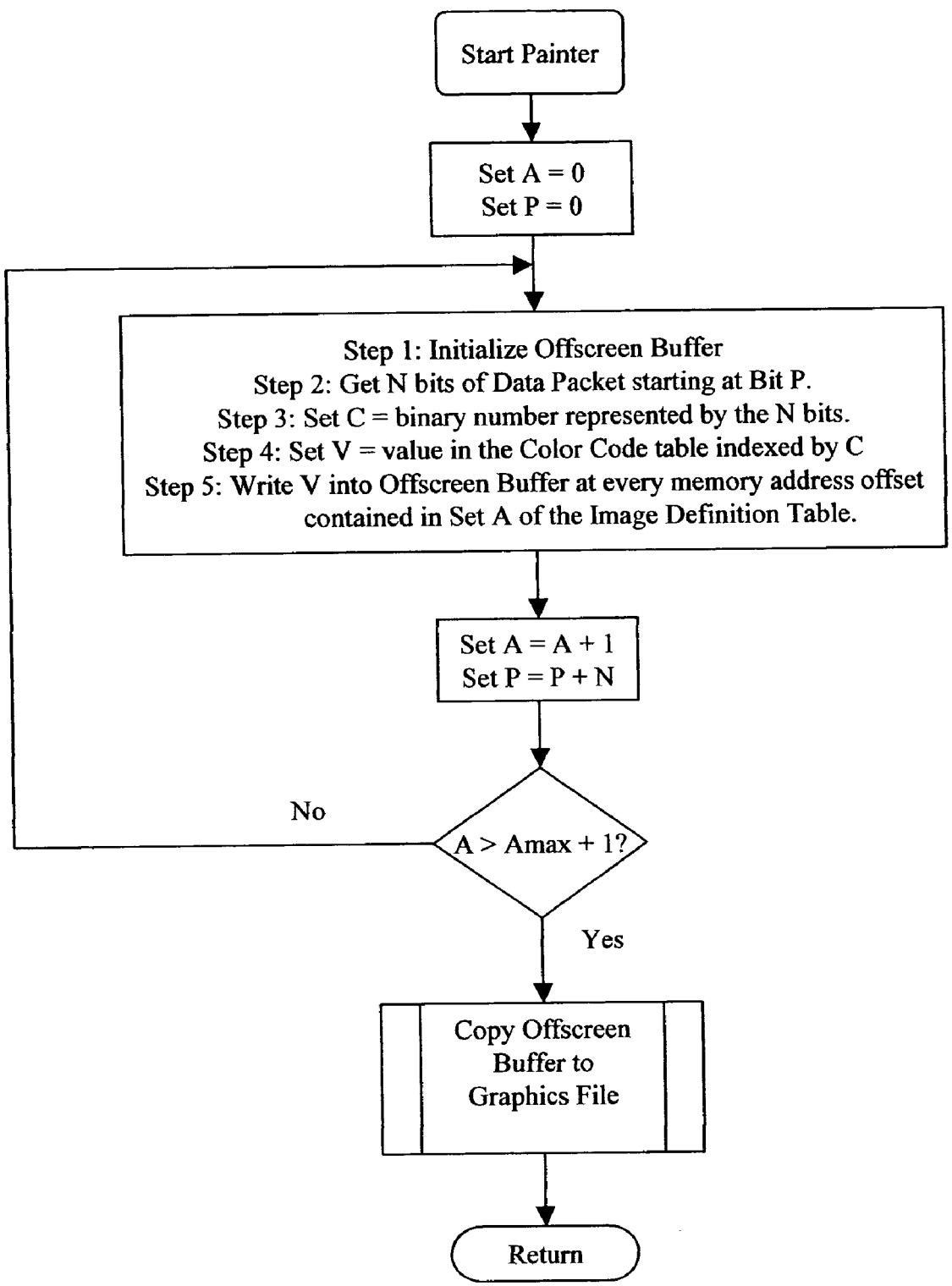

FIG. 4 describes an Image Definition Table. The Receiver's Image Definition Table (208) is an Image Definition Table used by the Receiver's Program. FIG. 5 describes a Color Code Table. The Receiver's Color Code Table (210)

is a color code table used by the Receiver's Program. FIG. 6 describes a Data Packet. The Receiver's Data Packet (212) is a Data Packet used by the Receiver's Program.

Receiver's Program

Figure 10:
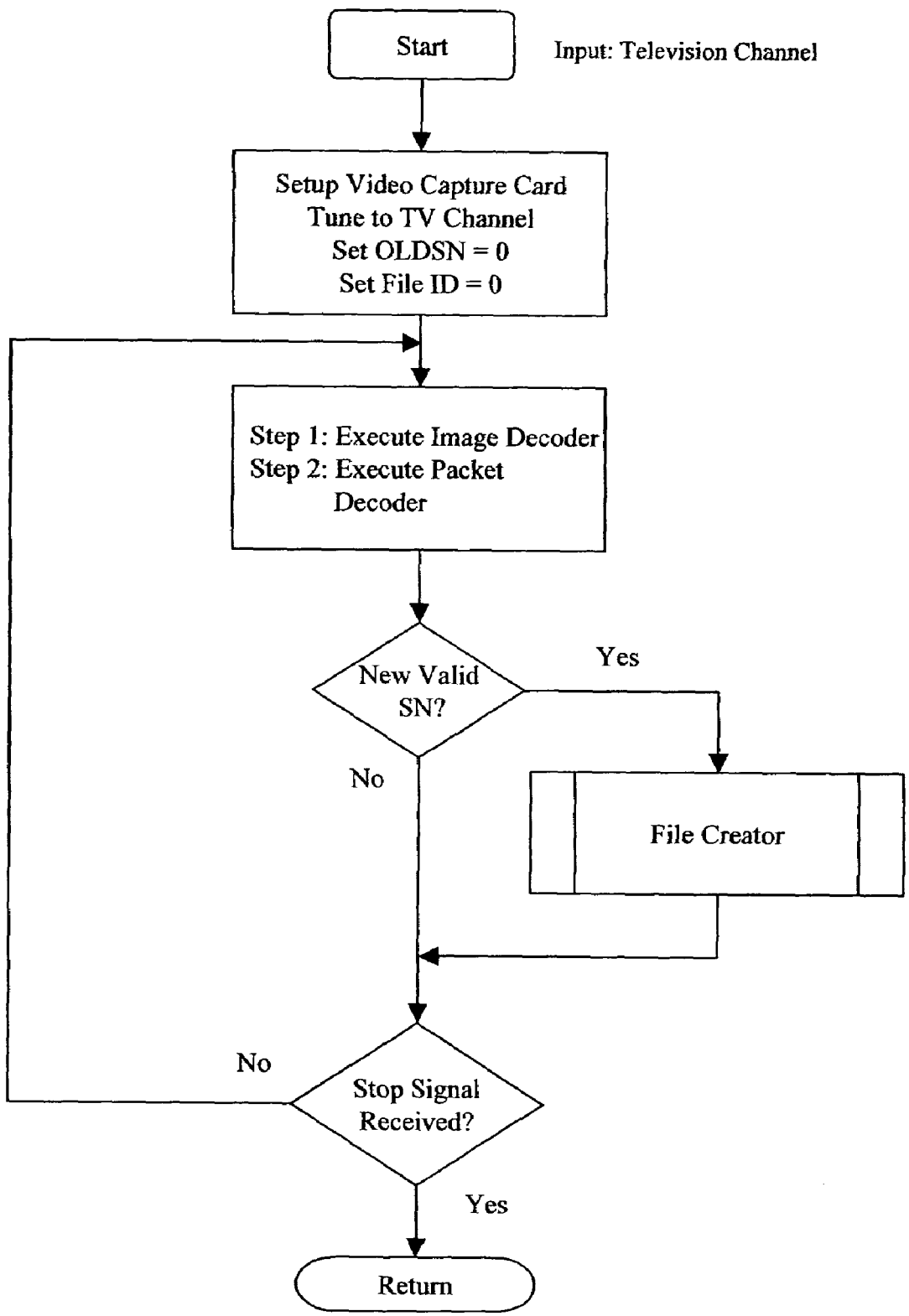

FIG. 10 is a software flowchart describing the Receiver's Program (200). The program requires one input—a television channel. The program tunes the Video Capture Card's television tuner to the specified television channel and sets parameters required to select the numbers Cmax, Rmax, and B.

The Receiver's Program initializes the numbers OLDSN and File ID equal to any non-positive integer. Next, it executes a program called Image Decoder and then executes a program called Packet Decoder. The program Packet Decoder returns a positive integer called SN.

If SN equals zero the program discards the packet. Otherwise it compares SN and OLDSN. If the numbers are different then the program executes File Creator.

The Receiver's Program then tests to see if any stop signal has been received. If it detects a stop signal, the program returns to its caller. Otherwise it continues to decode images.

Image Decoder

Figure 11:
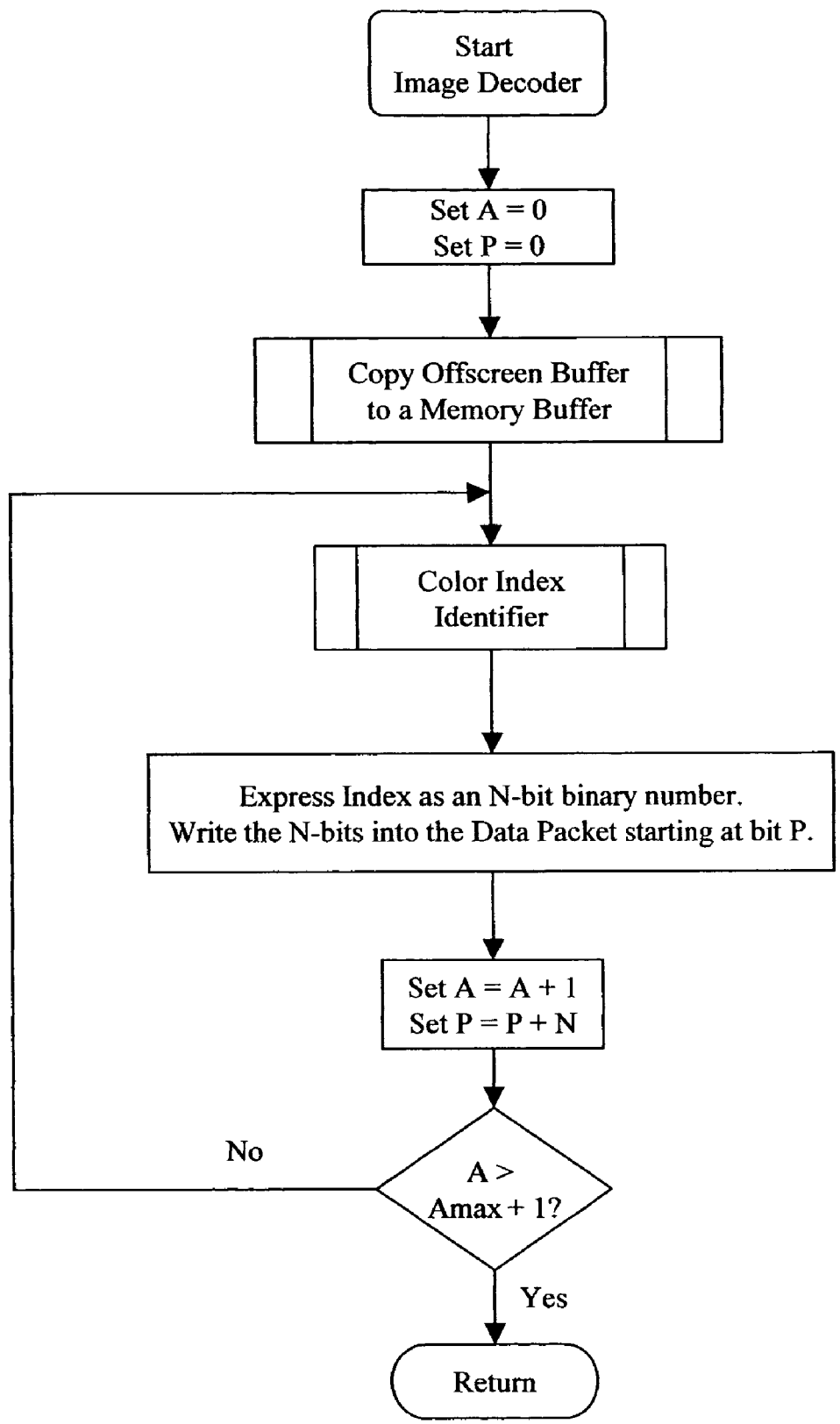

FIG. 11 is a software flowchart describing the Image Decoder. The Image Decoder is a program that uses the Video Capture Card (204) to analyze television images. It uses the Receiver's Data Packet (212), the Receiver's Color Code Table (210), and the Receiver's Image Definition Table (208). It also uses the Off Screen Buffer (206).

The Image Decoder copies the Off Screen Buffer into a portion of read-and-write memory called a Memory Buffer. The Memory Buffer contains the same number of bytes as the Off Screen Buffer.

The Image Decoder then processes each area described in the Receiver's Image Definition Table (208). It calls Color Code Index, a program that returns a number N binary digits. The program then fills in the Receiver's Data Packet (212) N bits at a time. Once all the areas are processed, the Image Decoder returns to its caller (The Receiver's Program).

Figure 12:
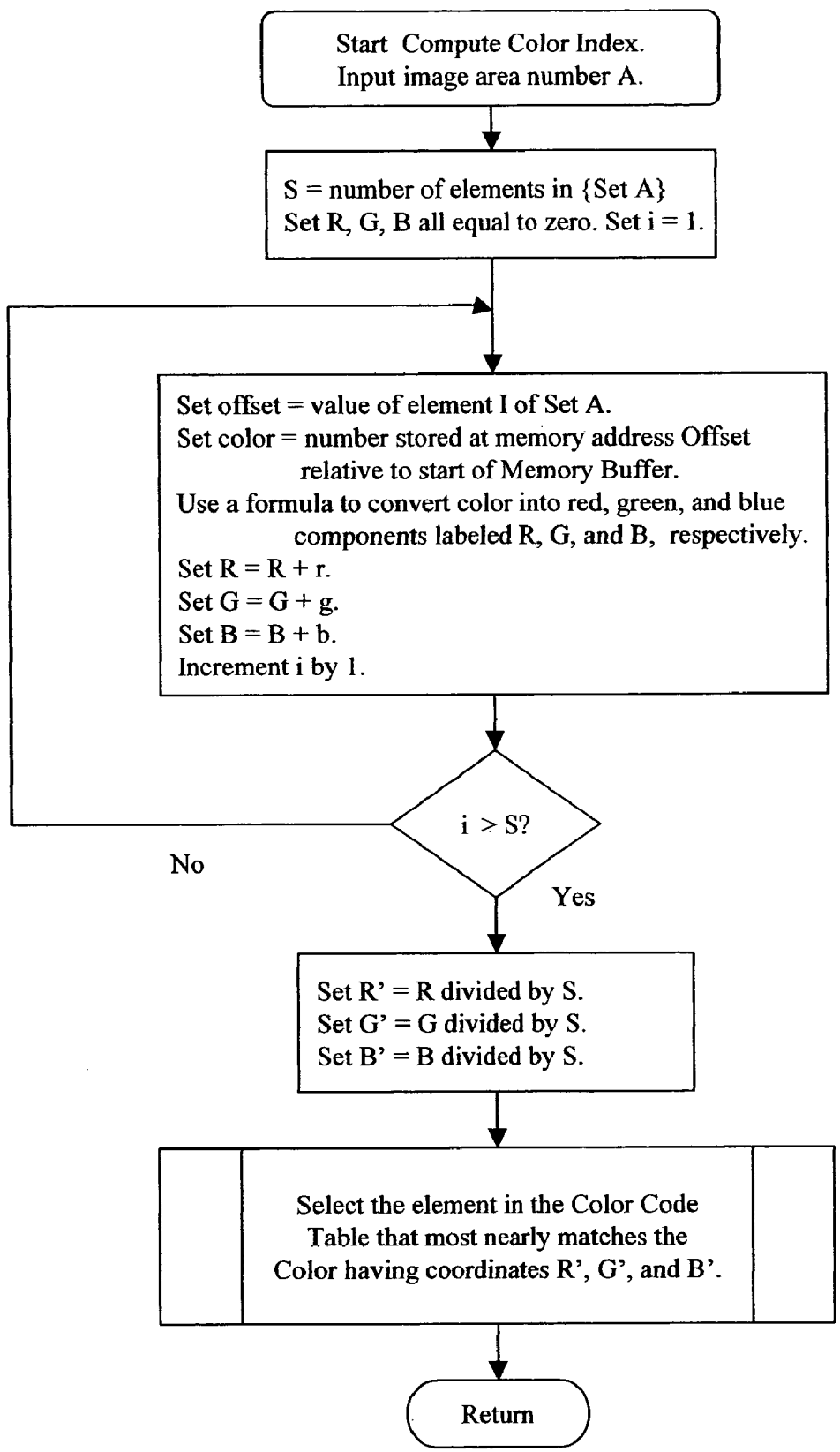

FIG. 12 is a software flowchart describing the Color Index Identifier. The program starts by setting the values of variables R, G, B, and i to zero. It sets the variable S equal to the number of elements in Set A of the Receiver's Image Definition Table (208).

The program then processes each pixel in the image area A. The pixels are expressed as offsets from the beginning of the Memory Buffer. The Color Index Identifier reads the value of the pixel from the Memory Buffer. It uses a formula to compute the red, green, and blue color components of the pixel and adds them to the numbers R, G, and B, respectively.

When all the elements of Set A have been processed, the program divides the numbers R, G, and B by S to produce R', G' and B'. A formula is used to compute an error value for each color in the Receiver's Color Code Table (210). The formula combines the numbers R', G', B' and the $r_i$, $g_i$, and $b_i$, to compute the error value, $e_i$, for row i of the Table. The program identifies the row having the smallest error value and returns the index of that row.

Image Decoder—First Alternate Embodiment

Figure 11A:
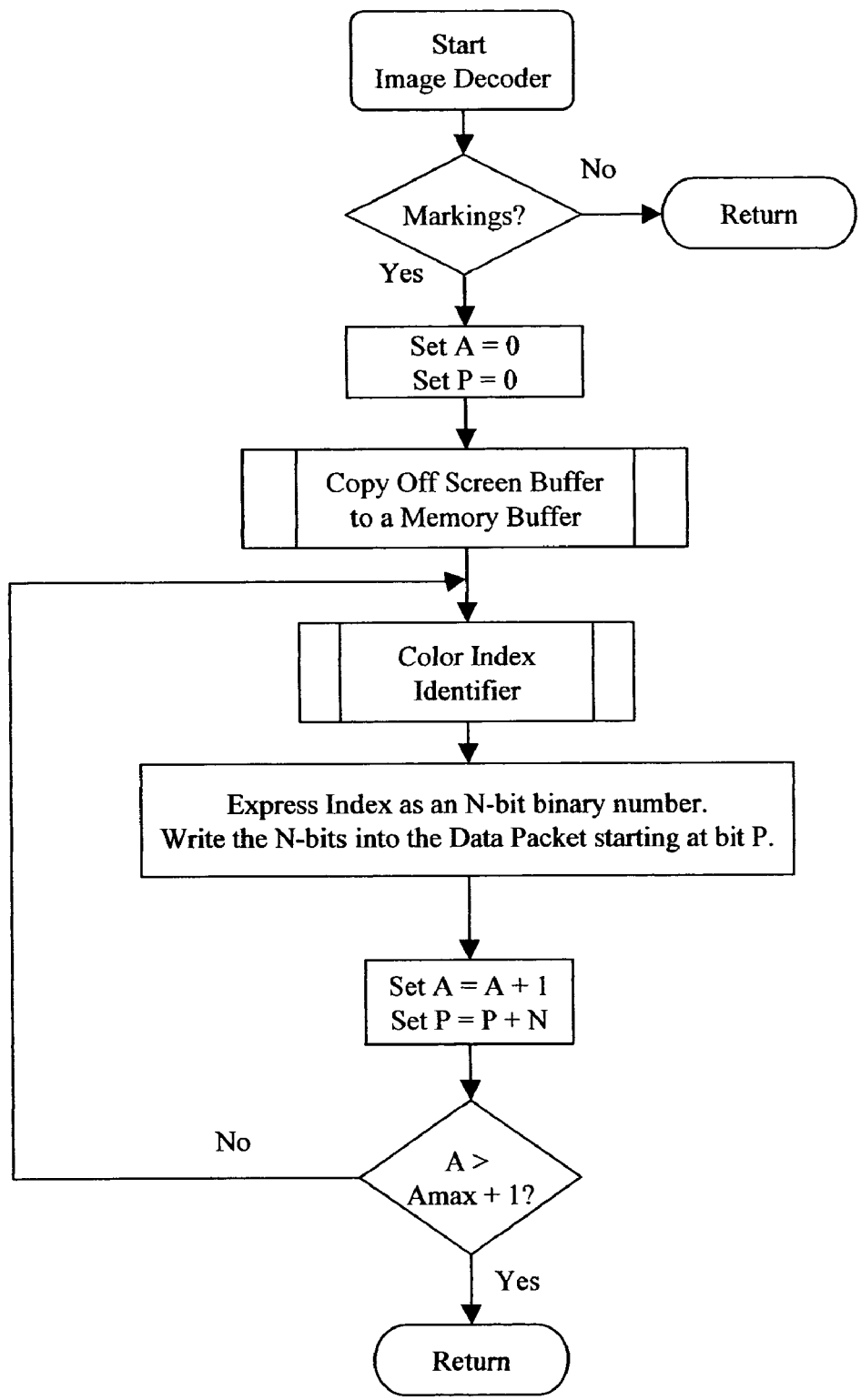

FIG. 11*a* is a flowchart of an Image Decoder that uses Pre-Determined Markings. The alternate Image Decoder compares the colors of the pixels at the pre-determined locations with the colors of the pixels that make up the Pre-Determined Marking. The alternate Image Decoder may, as an option, search for the pre-determined pattern of pixel colors using a method that would recognize the pre-determined pattern even of all the pixel locations were shifted to the left or right or shifted up or down within specified limits.

Image Decoder—Second Alternate Embodiment

Figure 11B:
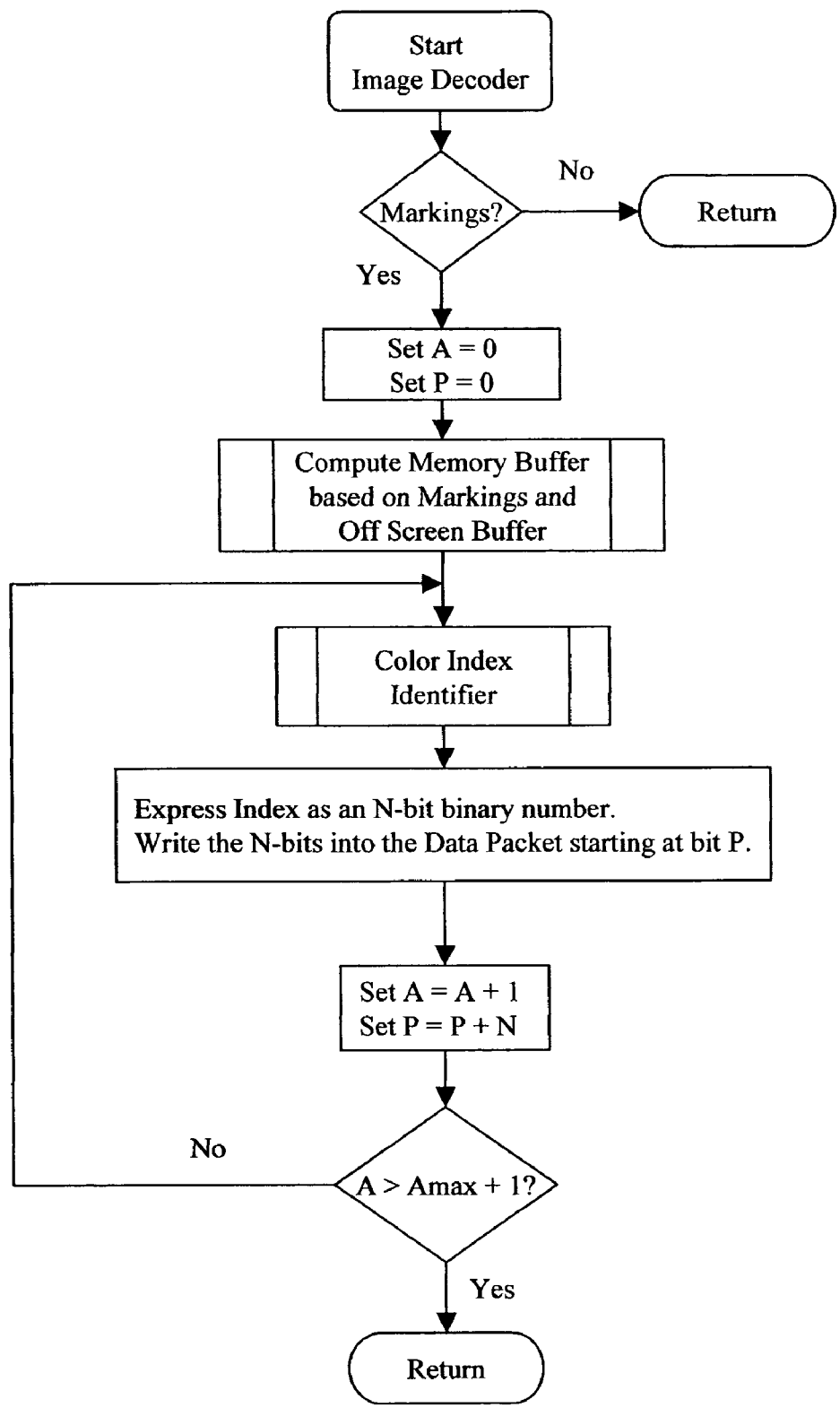

FIG. 11*b* is a flowchart of a second alternate Image Decoder. The second alternate Image Decoder uses the optional search method of Alternate Embodiment 2. There may be more than one Pre-Determined Marking, or marking. There will be an Error Pair associated with each marking. The pair will consist of the vertical and horizontal differences between the detected position of the marking and the pre-determined position of the marking.

The second alternate Image Decoder uses a formula combining the contents of the Off Screen Buffer and all of the Error Pairs to create the contents of the Memory Buffer. For example, the second alternate embodiment shifts and scales the image so that the markings are in the predetermined locations and then applies the same shifting and scaling formula to all the pixels in the received image.

Packet Decoder, File Creator, and File Finalizer

The Packet Decoder is a program that processes the information in the Data Packet (212). It uses an error-detecting code to compute a checksum based on bits 0 through c−1 of the packet. The program compares the checksum and the bits stored in the Checksum Field of the packet. If the numbers are not identical, the program sets the Packet Sequence Number in the Data Packet equal to zero.

Figure 13:
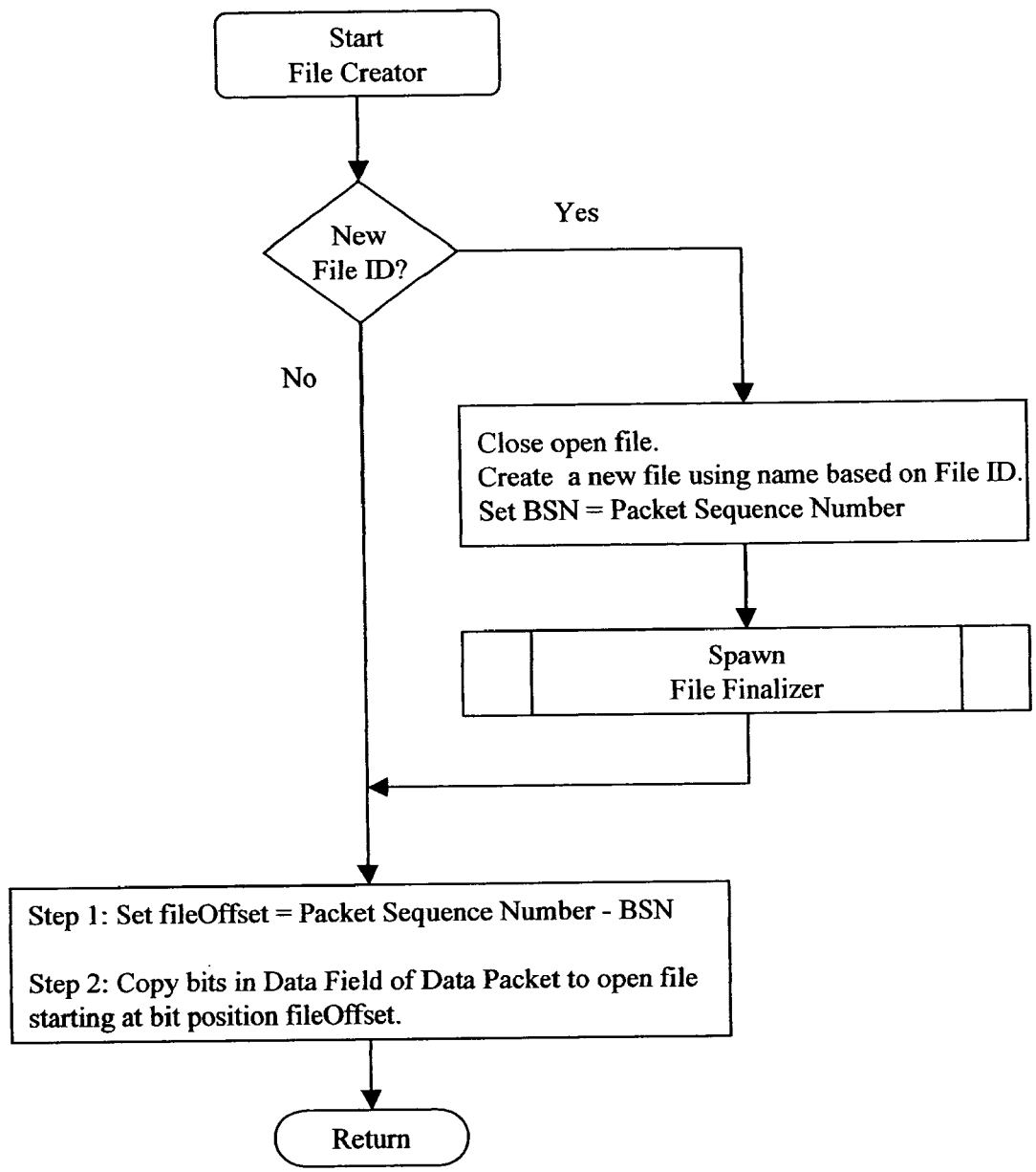

FIG. 13 is a software flowchart describing the File Creator program. The program examines the Receiver's Data Packet (212). If the File ID not the same as the one in the previous packet, then the program closes the file it was writing and opens a new file based on the new File ID. It copies the Packet Sequence Number into a number BSN (beginning serial number) and spawns an independent process or thread of execution called File Finalizer and passes it the File ID of the closed file.

The File Creator then sets a number, fileOffset equal to the Packet Sequence Number−BSN. It copies the bits from the Data Field of the Data Packet to the open file starting at bit position fileOffset. The program then returns to its caller.

The File Finalizer is spawned or created by the File Creator whenever the File Creator closes a file. The File Finalizer recognizes two types of files: data files and metadata files. A metadata file is associated with a data file. Metadata files fit entirely within one Data Packet (212) and contain information about data files.

The File Finalizer expects to find a pair of associated files. One member of the pair is a data file and the other member is a metadata file. The Finalizer examines the File ID that was input and uses a formula to compute the File ID of the related file. For example, the data file with File ID=2*n is associated with a metadata file with File ID=2*n+1 where n is an integer.

A metadata file describes the size of its associated data file. Optionally, the metadata file can contain a desired name for the associated file as well as any other useful information.

The File Finalizer computes the filename of a file associated with the input File ID. It then searches the Receiver's Disk for a file with the computed name. If it finds such a file, it retrieves the length L of the data file from the metadata file. It then creates a new data file consisting of the first L bits of the data file member of the associated pair. If the metadata indicates a desired filename, then the File Finalizer sets the name of the new data file to be the desired filename.

File Finalizer—Alternate Embodiment

Figure 13A:
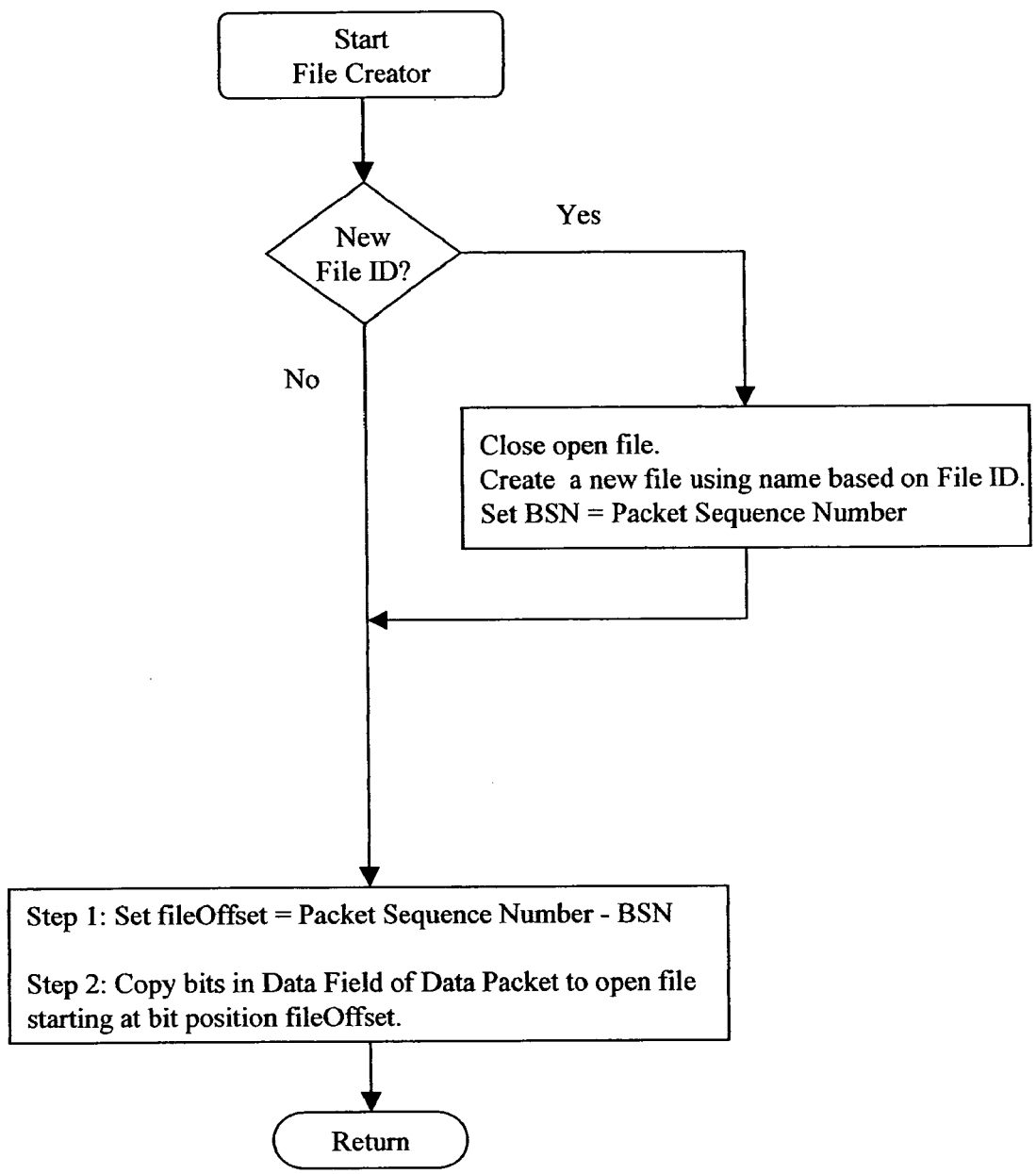

FIG. 13a is a flowchart of an alternate embodiment of the File Creator. The alternate embodiment processes only data files. A file created by the alternate embodiment may contain bits near the end of the file that do not exist in the Sender's version of the file.

Operation

The Sender's Equipment and the Receiver's Equipment must be installed in their respective locations.

The Receiver's Image Definition Table (208) must contain the same information as the Sender's Image Definition Table (108). The Receiver's Color Code Table (210) must contain the same information as the Sender's Color Code Table (110). The bit position numbers used to define the structure of the Receiver's Data Packet (212) must be the same as the bit position numbers used to define the structure of the Sender's Data Packet (112). The Receiver's Video Capture Card and the Sender's Computer Graphics Card must be set to the same graphics mode.

The sender prepares a set of files that he or she wants to broadcast and associates a File ID with each file in the set. He or she should select a Starting Sequence Number. The sender puts a videotape in the videocassette recorder and presses Record. He or she then runs the Sender's Program once for each file in the set of files. Each time the sender runs the program, he or she should set the Starting Sequence Number equal to the sequence number returned when the program had been run last.

When all the files have been processes, the sender stops recording onto the video tape. He or she then takes the videotape to a television station and tells the appropriate television station personnel that the videotape contains a television commercial.

The sender buys paid advertising time. The television station personnel indicate to the sender approximately when the sender's television commercial will be aired. The indication does not have to be too precise and, in fact, the videotape does not have to be broadcast continuously. For example, the sender can be told that a sixty second commercial will air sometime between midnight and 4 AM on a particular day. The television station can broadcast the commercial during a sixty second timeslot, or during two thirty second time slots, or during any combinations of timeslots as long as all the material on the tape is broadcast. The television station may broadcast portions of the tape more than once.

The sender informs all potential receivers that the commercial will be broadcast on a specified channel during a specified time interval. A receiver runs the Receiver's Program prior to the start of the specified time interval and enters the specified channel. Files will appear on the Receiver's Disk from time-to-time as the television images comprising the commercial are received.

Theory of Operation

Information stored in a computer file is represented as a sequence of bits. The Sender's Program converts the information into a sequence of data packets. In typical data communications applications the sequence of data packets would be written to a modem.

My invention involves converting the sequence of data packets into a sequence of images. The Painter, a component of the Sender's Program, draws a pre-determined set of areas in the image by storing information in a Video RAM. The Painter draws the areas in a pre-determined sequence thereby creating a digital image.

Although the set of areas and the sequence in which they are drawn is pre-determined, the colors of the areas are not pre-determined. The Painter converts the data packet into a sequence of colors that it uses to draw the areas.

The Computer Graphics Card creates a signal that can be used to display digital images on television set. If the card is connected to a videocassette recorder, then the digital images can be written onto videotape. Alternatively, the Painter can write the digital images to a computer graphics file or a sequence of files.

Images on the videotape are called a television program. The videotape is sent to a television station. The television station broadcasts the television program. Alternatively, the videotape can be processed by conventional video post-processing equipment. For example, the images can be superimposed on normal television images. The processed images can be sent to the television station. As a second alternative, computer graphics files produced by the Painter can be processed by conventional video post-processing equipment.

A receiver receives the television signal and connects it to a video capture card. The card is normally used to display a television program on the computer screen. The card converts a television image into information stored in a RAM called Off Screen Buffer. Typically there is software that reads the Off Screen Buffer and writes information into a video RAM so that the image is displayed on the screen.

My invention involves converting the information in the Off Screen Buffer into a data packet. The Image Decoder, a component of the Receiver's Program, examines the information and determines the color of each pre-determined area. When the television station is broadcasting my television program, the Image Decoder will find uniformly colored areas. At other times areas consisting of more than one pixel may not be uniformly colored. In either case the Image Decoder assigns a single color to the area thereby converting an image, or a sequence of areas, into a sequence of numbers. The sequence of numbers is converted into a data packet.

Thus the television program is analyzed as a sequence images that become a sequence of data packets. The sequence of packets is converted into one or more computer files. In this manner a set of computer files is broadcast to a large number of receivers.

CONCLUSIONS, SCOPE, AND RAMIFICATIONS

My invention is a method of broadcasting a sequence of bits. Although it can be used to broadcast files, it can also be used to broadcast a sequence of bits that are captured or generated in real-time.

My invention is a method of using a sequence of images to represent the information in a sequence of bits. It can be useful in applications that do not involve broadcasting. For example, a sequence of bits can be recorded on videotape as a sequence of images. The tape can later be used to reproduce the bit stream.

Data packets are used to distinguish between images prepared by my invention and ordinary television images. Only the sequence number and checksum is required for this purpose. The file ID can be used more generally as a bit stream ID.

There can be more than one data packet per image as long as no packet spans more than one image. In other words, the number of data packets per image can be any positive integer.

When the computed checksum does not match the checksum in the packet, the image is rejected. Other methods of image rejection can be used such as failure to find pre-determined markings or excessive error values encountered when matching colors to areas.

The areas used within an image to encode binary information may cover the entire image or may cover only part of the image. The maximum data transmission rate will be obtained using the entire image with each area containing only one pixel. However such images would convey no information to human television viewers. It is possible to combine data-carrying areas with normal areas in an image. For example, there could be a stripe on the bottom of the screen with data-carrying areas. The rest of the screen can show normal television pictures. Some news shows display a moving text banner on the bottom of the screen. The background of the text banner could contain data-carrying areas allowing the news program producer to broadcast data (such as Web pages) along with the news show.

The images produced by my invention can be processed by normal video post-processing equipment. The images could be displaced on the screen. Information can be recovered using pre-determined markings. Software within a receiving system can search for pre-determined patterns to detect the displaced location of the data-carrying images. The software can then recover the data by applying a displacement either to the received pixels or to the information in the image definition table.

The receiving system can use several techniques to tune to the television channel that contains data-carrying images. The user can input a channel number based on a broadcast schedule published in a newspaper, downloaded from the Web, or communicated in any known manner. A schedule can also be broadcast using my invention. It is also possible for the receiver's system to scan television channels to detect data-carrying images by creating packets and computing checksums. When the receiver's system finds valid checksums then it can remain tuned to the channel.

It is possible to broadcast data on more than one television channel simultaneously. The receiver's equipment would have to be modified in a straightforward manner to handle more than one television signal simultaneously.

My invention deals with images. Television is only one way to communicate images. Any other method of conveying images can also be used. Any means of television broadcast, including over-the-air, cable, and satellite television can be used. Any television signal format, including NTSC, PAL, SECAM, HDTV can be used. The graphics mode used by the sender and the receiver must be the same. In addition, the graphics mode must not exceed the capabilities of the television transmission system. It must use only those colors that can be distinguished by the receiver. It must use areas large enough to be distinguished by the receiver. For example, the sender can use a graphics mode with 640×480 pixels and a 16-bit color depth. If it uses smaller pixels or more bits per pixel, information will be lost by the transmission method and the receiver will not be able to reproduce the bit stream. However it is possible to use fewer colors or larger areas to compensate for channel impairments.

The videotape used in my invention can be replaced by any other means of storing images acceptable to a television station. It is also possible to have a direct electronic link between the sender's equipment and the television station. Images can be transmitted over this link. The images can be stored at the television station for later broadcast or they can be modulated and broadcast in real-time as they are received over the electronic link.

It is not always necessary to associate data and metadata. Some applications may not require specific names for the received files or they may not require received files to be the same length as the original files. If metadata is used, it can be written to the receiver's computer by any means including downloading the information from the Web.

The television program created by my invention does not have to be broadcast as a television commercial. Any television broadcast can serve to broadcast data. The television program can be as short as a single frame of video or it can be continuous and perpetual.

There can be more than one image definition table used during a single broadcast as long as both the sender and the receiver have means to know which table is used for each image. For example there can be a data packet with a file ID indicating that the information is intended for the consumption of the receiving program. The data packet can contain a new image definition table that is applied to subsequent images. Alternatively, there could be a set of pre-installed image definition tables with a rule that determines which one is used. The rule can be based on sequence number, on the number of images processes, or the rule can depend on a data packet that indicates which table to use. These remarks also apply to color code tables.

A look up table technique can be used in the receiver to determine the colors of the pre-determined areas within an image. The table can associate a color index with sets of red, green, and blue color components. The table is a generalization of the Receiver's Color Code Table because the row number is replaced by the color index. This implies that several different colors can be mapped to a single index. Slight color errors caused by transmission and processing can be corrected by mapping groups of colors to the index representing the "ideal" or "correct" color. Moreover, the look up table technique can be used to achieve aesthetic goals. For example a binary encoding could be represented by black and white, blue and green, light red and dark red, etc. A video post-production technician can decide which color pair to use based on the images on which the data is being superimposed. The look up table technique can be used, for example, to assign black, blue and light red to color index 1. It can assign white, green, and dark red to color index zero. Thus the post-production technician is free to make creative decisions with no modification whatsoever to the receiver software or data tables.

Although the description above contains many specificities, these should not be construed as limiting the scope of the invention but as merely providing illustrations of some of the presently preferred embodiments of this invention.

Thus the scope of the invention should be determined by the appended claims and their legal equivalents, rather than by the examples given.

I claim:

1. A method of encoding a data file in a sequence of video frames, said file having a name and comprising a sequence of bits contained within a pre-determined number of bytes, said method comprising the steps of:

creating a first sequence of data packets each comprising a header field, a user data field comprising a first pre-determined number of bits, and a checksum field;

partitioning said sequence of bits into a first sequence of blocks each comprising a number of bits less than or equal to said first pre-determined number of bits;

associating each respective block in said first sequence of blocks with a respective data packet in said first sequence of data packets;

copying each said block into the user data field of said respective data packet;

creating a metadata packet comprising a header field, a user data field comprising said first pre-determined number of bits, and a checksum field;

encoding information in the user data field of said metadata packet comprising said name and said pre-determined number of bytes;

creating a second sequence of data packets comprising said first sequence and the metadata packet;

associating each data packet in said second sequence with a respective video frame in said sequence of video frames;

partitioning each data packet in said second sequence into a second sequence of blocks each comprising a second pre-determined number of bits;

creating a sequence of binary numbers by examining said second sequence of blocks and interpreting said second pre-determined number of bits as a binary number;

allocating respective regions of said respective video frame to each number in said sequence of binary numbers;

assigning video component levels associated with each said binary number to each said region to generate said respective video frame; and outputting each video frame in said sequence of video frames whereby the data file is represented as a sequence of video frames.

2. A method according to claim 1, wherein the header in said data packet contains a number associated with said data file and the header in said metadata packet contains a number associated with said data file.

3. A method according to claim 1, wherein the header in said data packet contains a number associated with a particular block in said first sequence of blocks.

4. A method according to claim 1, wherein the video frame is output to a graphics file containing one image or a plurality of images.

5. A method according to claim 1, wherein the video frame is output to a storage device.

6. A method according to claim 5, wherein the storage device is videotape.

7. A method according to claim 1, wherein a look up table is used to assign said video component levels.

8. A method according to claim 1, wherein pre-determined regions of said respective video frame are assigned pre-determined video component levels.

9. A method according to claim 1, wherein an integral number of data packets is associated with a video frame.

10. A method of decoding a data file encoded in a sequence of video frames, said file having a name and comprising a first sequence of bits contained within a pre-determined number of bytes, said method comprising the steps of:

inputting a sequence of video frames each comprised of a pre-determined sequence of pre-determined regions comprised of pixels;

assigning a set of video component levels to each region in said pre-determined sequence by sampling the video component levels of each of the said pixels and combining the sampled levels;

creating a sequence of binary numbers each comprised of a first pre-determined number of bits by associating a respective binary number with each said region;

creating a sequence of bits by combining the bits comprising each said respective binary number;

partitioning said sequence of bits into a first sequence of data packets each comprising a header field, a user data field, and a checksum field;

validating each packet in said first sequence of data;

creating a second sequence of data packets comprised of valid data packets contained in said first sequence of data packets;

dividing said second sequence into a metadata packet and a plurality of normal data packets;

creating a first data file;

copying bits from said normal data packets to said first data file;

decoding the bits in the user data field of said metadata packet to determine a file name and a file size;

creating a second data file;

associating said file name and said second data file;

copying a number of bytes equal to said file size from the first data file to the second data file whereby said data file encoded in a sequence of video frames is decoded.

11. A method according to claim 10, wherein performing a checksum calculation validates packets.

12. A method according to claim 10, wherein a packet is validated by sampling pre-determined video component levels at pre-determined regions of a video frame that encodes the packet.

13. A method according to claim 10, wherein the position of pre-determined regions within a video frame is determined by a method comprised of sampling pre-determined video component levels.

14. A method according to claim 10, wherein a set of video component levels is determined by a method comprised of sampling video component levels at pre-determined regions of a video frame.

15. A method according to claim 10, wherein said file name and file size is determined using bits in the header fields of said first sequence of data packets.

16. A method according to claim 10, wherein the file size is indeterminate.

* * * * *